United States Patent Office 3,436,205
Patented Apr. 1, 1969

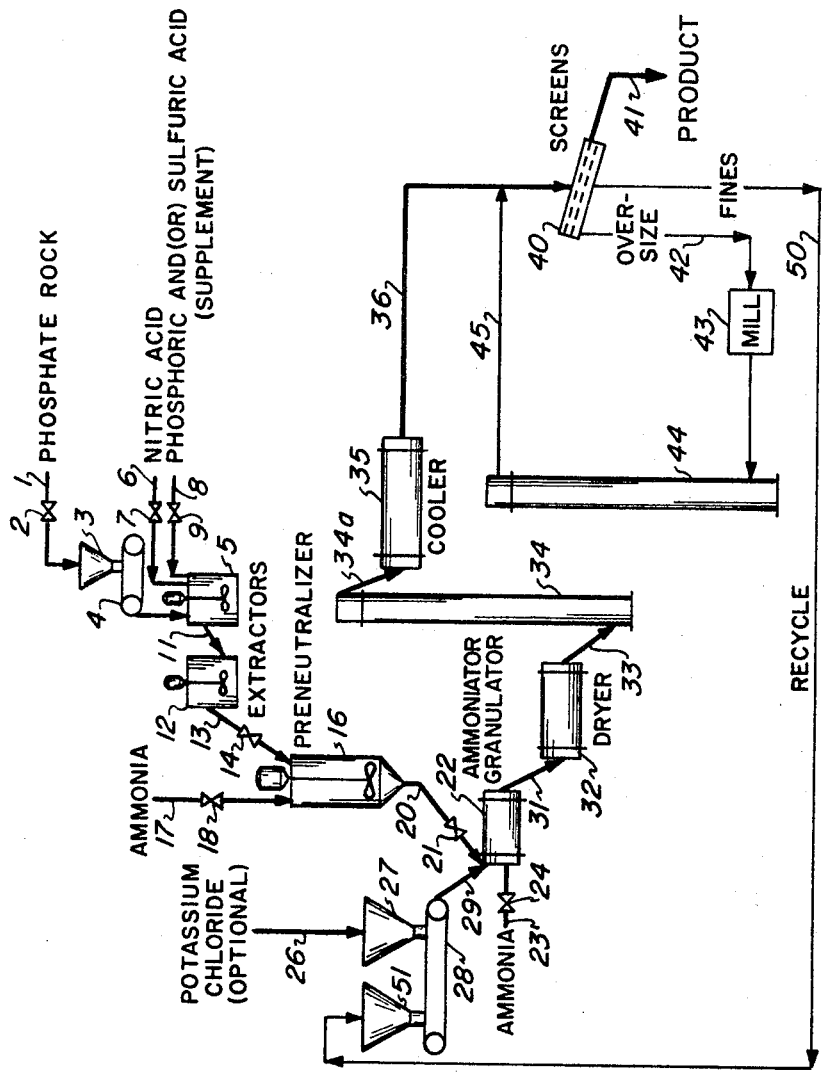

3,436,205
PROCESS FOR PRODUCING GRANULAR NITRIC PHOSPHATE FERTILIZER WITH HIGH PHOSPHATE AVAILABILITY
Charles H. Davis, Muscle Shoals, Ala., assignor to Tennessee Valley Authority, a corporation of the United States
Filed Aug. 26, 1965, Ser. No. 482,953
Int. Cl. C05b *11/06*
U.S. Cl. 71—39     2 Claims

ABSTRACT OF THE DISCLOSURE

A nitric phosphate process for production of granular fertilizers from nitric acid, phosphate rock, phosphoric acid, sulfuric acid, and ammonia. Phosphate rock is reacted with the acids in two extraction tanks and then the resulting extract is reacted with part of the ammonia in a preneutralizing tank. Slurry from the preneutralizing tank is fed to a TVA-type rotary drum where the remaining ammonia and recycled fines are added and granulation is attained. The granulator product is dried, cooled, and screened. Oversize material is crushed and recycled back to the ammoniator-granulator along with the undersize material. Typical grades are 20–20–0, 26–13–0, 14–28–0, and 15–15–15. Product appearance and storage characteristics are excellent.

---

The invention herein described may be manufactured and used by or for the Government for governmental purposes without payment to me of any royalty thereon.

My invention relates to a new and improved process for the manufacture of nitric phosphate fertilizers. The term "nitric phosphates" is used in this specification to represent a variety of fertilizer products that are made by processes in which principally nitric acid is used to react with phosphate rock.

Because of the inherently favorable economics involved, TVA has, over the past 19 years, studied and developed various processes for making nitric phosphate fertilizers. Such processes have the advantages of using phosphate rock to supply a large portion of the phosphate needed and of using nitric acid for the twofold purpose of solubilizing the rock and supplying part of the nitrogen.

The last work previously reported by TVA [1] involved the operation of a pilot plant with a TVA-type ammoniator-granulator following a two-stage extraction system for reaction of the phosphate rock and acids. Although the equipment used was conventional and the raw materials cost for the grades produced by this process was significantly lower than the costs for competing products, fertilizer manufacturers in this country have not made wide use of the TVA modification of the nitric phosphate process. This work later matured into U.S. Patent 3,005,697. McKnight et al., October 24, 1961. Several nitric phosphate plants which use the "Spheroidizer" [2,3] method of granulation have been constructed both in this country and abroad. Production of nitric phosphates in Europe has been substantial and the TVA ammoniator-granulator process has been used in a few plants.

There were probably four major disadvantages in the processes previously developed: The processes required nitric acid which was not readily available in many areas. In relatively large complex plants the production rates were low because of the high recycle rates required.

Process flexibility was limited and only a narrow range of grades could be produced economically, and in addition, the water solubility of the phosphate in the products was low—usually substantially less than about 20 percent. (In recent years some States have been recommending a minimum water solubility of 40 percent.)

My most recent studies in this area have been directed toward improving the efficiency and versatility of the process and improving the quality of the products. Objectives of the current work have been: (1) to evaluate the use of a preneutralizer to decrease the recycle requirements; (2) to evaluate the effect of using concentrated nitric acid (containing as much as 65 percent $HNO_3$) and superphosphoric acid; (3) to develop economical means of increasing the water solubility of the phosphate in the products; and (4) to develop procedures for producing a wider variety of grades and ratios so that greater process flexibility will be possible.

Because of the recent rapid increase in popularity of ammonium nitrate, nitric acid is now readily available in many areas in plant complexes. Therefore, the use of nitric acid as a raw material can no longer be considered a process disadvantage.

In my most current work on the nitric phosphate process, I have found that the use of more highly concentrated nitric and phosphoric acids and the preneutralization of the extraction slurry can be utilized to decrease the recycle requirements substantially. Recycle to product ratios for several grades have been decreased to about the same level (2:1 to 5:1) as were required in the pilot-plant development of the TVA granular diammonium phosphate process. During this work, various grades were satisfactorily produced with $N:P_2O_5$ ratios ranging from 1:2 to 2:1. In addition, procedures for economically increasing the water solubility of the phosphate in the products were developed. Products with water solubilities of 25, 40, 50 and 60 percent were produced satisfactorily. Most of my work was done with 20–20–0 and 15–15–15 grades using the phosphoric acid modification of the process. Several operating variables were also studied.

Theoretical considerations

Chemical Reactions.—In the acidulation of phosphate rock with nitric acid, the rock, which is principally tricalcium phosphate, is converted to calcium nitrate and phosphoric acid. In my work, phosphoric acid (and, in some cases, a small amount of sulfuric acid) was also added to the reactor in order to aid in solubilizing the rock and to increase the water solubility of the phosphate compounds in the final product. That is, in addition to solubilizing the rock, these acids are used to adjust the ratios of phosphate compounds in the product. A simplified version of the chemical reactions involved in the production of 20–20–0 nitric phosphate containing 40 percent water-soluble phosphate is shown in Table I below. In this particular formulation, there is an excess of nitric acid above that required for reaction with the rock. After ammoniation, the product contains ammonium nitrate, dicalcium phosphate, monocalcium phosphate, monoammonium phosphate, calcium fluoride and calcium sulfate.

Table I

[Chemical reactions for 20–20–0 grade nitric phosphate with 40 percent water-soluble $P_2O_5$ (lb. moles/ton of product)]

Acidulation

Phosphate rock: $3.94\ CaO + 2.14\ PO_4 + 0.92\ F +$ wet-process phosphoric acid: $3.59\ H_3PO_4 + 0.24\ H_2SO_4 +$ ni-

---

[1] Hignett, T. P., Siegel, M. R., McKnight, David, and Achorn, F. P. J. Agr. Food Chem. 6, No. 11, 822–7 (November 1958).
[2] Smith, Benjamin G., U.S. 2,926,079. Feb. 23, 1960.
[3] "Fertilizers Pelletized New Way." Chem. Eng. News 37, No. 25, 38–9 (June 22, 1959).

tric acid: 13.27 $HNO_3 \rightarrow$ 3.70 $Ca(NO_3)_2$+5.87 $HNO_3$ +5.73 $H_3PO_4$+0.24 $CaSO_4$+0.92 HF.

Preneutralization (85% of ammonia)

Ammonia: 13.82 $NH_3$; +3.70 $Ca(NO_3)_2$+5.87 $HNO_3$ +5.73$H_3PO_4$+0.24 $CaSO_4$+0.92 $HF \rightarrow$ 13.27 $NH_4NO_3$ +0.46 $CaF_2$+2.50 $Ca(H_2PO_4)_2$+0.74 $CaHPO_4$+0.24 $CaSO_4$.

Ammoniation in ammoniator-granulator
(15% of ammonia)

Ammonia: 2.41 $NH_3$ +13.27 $NH_4NO_3$+0.46 $CaF_2$ +2.50 $Ca(H_2PO_4)_2$+0.74 $CaHPO_4$+0.24 $CaSO_4 \rightarrow$ 13.27 $NH_4NO_3$+0.46 $CaF_2$+3.13 $CaHPO_4$+0.24 $CaSO_4$+2.41 $NH_4H_2PO_4$+0.10 $Ca(H_2PO_4)_2$.

Formulating.—Formulating nitric phosphates involves some unique requirements in addition to the procedures normally followed—such as allowing for the correct amount of plant food, fixing the ammonia, and adjusting the weights of raw materials to give a ton of product. These requirements are: (1) feeding enough acid to convert the phosphate in the rock into an available form within a reasonable time; (2) making sure that the converted phosphate derived from the rock does not revert to an unavailable form during further processing; (3) avoiding the presence of calcium nitrate in the final product because it gives poor physical properties; and (4) attaining the desired water solubility of the phosphate in the final product.

For conversion of rock in the extractors, an acidulation mole ratio $$\left(\frac{HNO_3+H_3PO_4+2H_2SO_4}{CaO}\right)$$

of at least 1.8 is required. This ratio assures that about the theoretical amount of acid will be supplied for the conversion of the calcium in the rock to calcium nitrate, monocalcium phosphate, or calcium sulfate, thereby releasing the phosphate from the rock as phosphoric acid. Acidulation ratios higher than 1.8 give better operation because the rock is dissolved more rapidly and the proportion of water-soluble compounds in the product is higher. In most of my work the ratios were 2.2 or higher.

The product $$\left(\frac{CaO-CaSO_4}{P_2O_5}\right)$$

mole ratio should be 2.3 or less to avoid reversion of the phosphate. This ratio assures that the phosphate compounds present will not be more basic than dicalcium phosphate. However, localized overammoniation may cause reversion, even though the formulated $$\left(\frac{CaO-CaSO_4}{P_2O_5}\right)$$

mole ratio is less than 2.3. If all the ammoniation of the slurry from the extractors should be carried out in the slurry phase, multi-stage ammoniation as described by Striplin, et al.[4] should be used. In the current tests, ammoniating the slurry extract to a pH of about 2.0 to 2.5 in a preneutralizer and then completing the ammoniation in the TVA ammoniator-granulator gave only about 1 to 2 percent reversion of the phosphate. Apparently, the ammoniation in the TVA ammoniator-granulator is equivalent to multi-stage ammoniation in tanks.

The ratio of ammoniacal nitrogen to nitrate nitrogen should be at least 1.0 so that the nitrate will be fixed as ammonium nitrate. This reduces the formation of calcium nitrate to the point that it presents no problem.

Control of the water solubility of the phosphate in nitric phosphate products is important because products of higher water solubility require more phosphoric acid and less phosphate rock and, therefore, the cost of the raw materials is higher. Consequently, it is desirable to hold the water solubility as near the minimum requirement as possible. Results have shown that prediction of the water solubility is difficult because the exact distribution of the chemical compounds in the product cannot be predetermined. However, by combining theoretical relationships with experimentally determined values, nitric phosphate products with 40, 50, and 60 percent water-soluble phosphate were satisfactorily produced.

Two basic procedures were used to vary the water solubility of the phosphate in the products. In the first procedure, formulations were derived by building onto a basic 20-20-0 formulation which, experimental results showed, gave a 26 percent phosphate water solubility. Formulations of higher phosphate water solubility were made by calculating the amount of 100 percent water-soluble 20-20-0 mixture of ammonium nitrate and monoammonium phosphate required to increase the water solubility to the desired level. The ammonium nitrate and monoammonium phosphate required were made in the process by adding the proper amounts of nitric acid, phosphoric acid, and ammonia. When products with $N:P_2O_5$ ratios other than 1:1 were required, they were made by adding or subtracting ammonium nitrate (as nitric acid and ammonia) from the 1:1:X formulation with the desired water solubility. A sample calculation by this procedure for formulating is shown in Table II below.

Whenever formulations were underweight and required a filler, sulfuric acid and phosphate rock were used to replace the filler and an equivalent amount of phosphoric acid. Producing phosphoric acid in situ in this manner is the most economical means of increasing the water solubility. Whenever sulfuric acid and rock were added, the $$\left(\frac{CaO-CaSO_4}{P_2O_5}\right)$$

mole ratio was held constant to avoid changing the water solubility.

Table II.—Sample calculation for 20-20-0 nitric phosphate

A sample calculation for 20-20-0 grade with 40 percent phosphate water solubility is shown below:

STARTING FORMULATIONS

| Raw materials | Lb./ton for 20-20-0 grade | |
| --- | --- | --- |
| | Basic formulation (26% W.S. $P_2O_5$) | Mixture of $NH_4NO_3$+ $NH_4H_2PO_4$ (100% W.S. $P_2O_5$) |
| Ammonia | 269 | 302 |
| Nitric acid (100%) | 856 | 744 |
| Phosphoric acid (100%) | 304 | 552 |
| Phosphate rock (33.7% $P_2O_5$, 49.0% CaO) | 557 | |
| Filler | | 384 |
| Conditioner | 40 | 40 |
| Mole ratios: | | |
| $(CaO-CaSO_4):P_2O_5$ | 1.70 | |
| $(HNO_3+H_3PO_4+2H_2SO_4):CaO$ | 3.43 | |

Let X=lb. 100% W.S. $P_2O_5$ formulation
Y=lb. 26% W.S. $P_2O_5$ formulation
(1) 0.20X+0.20Y=400, $P_2O_5$ balance
(2) 0.20X+(0.26) (0.20Y)=160, W.S. $P_2O_5$ balance Solving Equations 1 and 2, we find X=380 and Y=1620.

Then the 40 percent water-soluble $P_2O_5$ formulation is (380/2000) (wt. of 100% W.S. material)+(1620/2000) (wt. of 26% W.S. material). After solving the above relationship, the weights of the raw materials in the 20-20-0

[4] Striplin, M. M., Jr., McKnight, David, and Hignett, T. P. Ind. Eng. Chem. 44, No. 1, 236-42 (January 1952).

grade with 40 percent water-soluble $P_2O_5$ are as shown in the following tabulation:

|  | 20-20-0 grade (40% W. S. $P_2O_5$) |
|---|---|
| $NH_3$ | 273 |
| $HNO_3$ (100%) | 831 |
| $H_3PO_4$ (100%) | 352 |
| Rock (33.7% $P_2O_5$, 49.0 CaO) | 447 |
| Filler | 73 |
| Conditioner | 40 |
| Mole ratios: |  |
| $NH_3$-N:$NO_3$-N | 1.22 |
| (CaO—$CaSO_4$):$P_2O_5$ | 1.38 |
| ($HNO_3$+$H_3PO_4$+$2H_2SO_4$):CaO | 4.30 |

The second procedure used for formulating involved avoiding the formation of any ammonium phosphates by holding the ratio of the ammoniacal nitrogen to nitrate nitrogen at 1.0 and varying the water solubility by varying the proportions of monocalcium and dicalcium phosphates in the product. This was accomplished by simply varying the proportions of rock and phosphoric acid to give the necessary CaO:$P_2O_5$ mole ratio for the desired water solubility. An example of a calculation by this procedure for formulating is shown in Table III below.

Table III.—Sample calculation for 14–28–0 nitric phosphate

A sample calculation for 14–28–0 grade with 40 percent water-soluble phosphate is shown below:
$NH_3$—N:$NO_3$—N ratio=1.0
CaO:$P_2O_5$ mole ratio=1.6 (40% of $P_2O_5$ is monocalcium phosphate and 60% is dicalcium phosphate)
Lb. N=(2000) (0.140) (1.02)=286 (allowing for a 2% N loss)
Lb. $NH_3$—N=286/2=143
Lb. $NH_3$=143/0.823=174
Lb. $HNO_3$—N=286/2=143
Lb. $HNO_3$=143/0.222=644
Lb. $P_2O_5$=(0.28)(2000)(1.01)=566 (allowing for a 99% product availability)
Mole $P_2O_5$=566/142=3.99
Mole CaO=(3.99) (1.60)=6.38
Lb. CaO=(6.38) (56.1)=358
Lb. rock=358/0.49=731
Lb. $P_2O_5$ from rock=(731) (0.337)=246
Lb. $P_2O_5$ from acid=566−246=320
Lb. $H_3PO_4$=320×98×2/142=442

14-28-0 formulation

| Raw materials: | Lt./ton for 40% W. S. $P_2O_5$ |
|---|---|
| Ammonia | 174 |
| Nitric acid (100%) | 644 |
| Phosphoric acid (100%) | 442 |
| Phosphate rock (33.7% $P_2O_5$, 49.0% CaO) | 731 |
| Conditioner | 40 |
| ($HNO_3$+$H_3PO_4$):CaO mole ratio | 2.31 |

The total weight listed above is about 2040 pounds after allowing for a 0.5 percent produce moisture. The rock normally has about a 6 percent weight loss as volatile compounds during the extraction step. This rock weight loss should reduce the final formula weight to about 2000 pounds.

The second procedure for formulating requires a higher proportion of nitric acid than the first procedure. Therefore, if the same concentration of nitric acid is used, formulations made by the second procedure will have a higher water input and will probably require more recycling and drying.

Possible grades.—Generally, the nitric phosphate process appears to be most attractive for grades with N:$P_2O_5$ ratios ranging from 1:2 to 2:1. To produce N:$P_2O_5$ ratios higher than about 2:1, the high proportion of nitric acid required results in a high water input, which necessitates the use of very high recycle ratios for control of the granulation. At the other extreme, whenever N:$P_2O_5$ ratios lower than 1:2 are produced, the lower nitric acid requirement results in a lower water input and this gives a viscous slurry. Also, the low proportion of nitric acid can result in slower dissolution of the rock, which further aggravates the slurry handling problems. Some grades that can be satisfactorily produced with 40 percent water solubility include 26–13–0, 20–10–10, 20–20–0, 15–15–15, 14–28–0, 11–22–11, and 10–0–0.

Grades with N:$P_2O_5$ ratios outside the ranges of 1:2 to 2:1 can be produced by adding other sources of nitrogen and phosphate besides nitric acid, ammonia, phosphate rock, or phosphoric acid. For example, triple superphosphate can be utilized in the production of a grade with an N:$P_2O_5$ ratio of 1:3. Whenever a supplemental material is used in this manner, the compounds in that material must be considered in applying the mole ratio rules listed in the section on formulating.

I have, therefore, discovered method and means to accomplish my desired result for developing a process for the manufacture of nitric phosphate fertilizers which comprises in one form thereof reacting nitric and phosphoric acids (and in some formulations, sulfuric acid) with phosphate rock in extraction vessels to form a slurry therein; withdrawing the slurry from the extraction vessels and introducing same into a preneutralizer vessel wherein the slurry is reacted with up to about 85 percent of the total ammonia to be added to the process; withdrawing the resulting substantially ammoniated slurry from the preneutralizer vessel and feeding same into the upper end of a TVA–type continuous ammoniator-granulator and simultaneosuly adding to said ammoniator-granulator recycled fines and the remaining amount of ammonia to be added to the process; withdrawing the resulting product from the ammoniator-granulator; drying, cooling and screening said product and returning the undersize along with crushed oversize as recycle to the ammoniator-granulator as a primary control of the granulation step. I have discovered that in practicing this process, the product resulting therefrom contains a phosphate availability as great as 99 percent and, in many instances, in excess of 99 percent. This result is completely unexpected in that my process utilizes only two ammoniating apparatus with as such as 85 percent of the total amount of ammonia added in the first apparatus, i.e., the preneutralizer vessel, and the remaining ammonia added in the second ammoniating vessel, the ammoniator-granulator. In processes of the prior art, it has long been taught and thought necessary to use at least four ammoniating vessels and, in fact, the production of nitric phosphate fertilizers in the prior art have long been thought to inherently involve, by necessity, multi-stage ammoniation in order to insure that the highest degree of phosphate availability will be retained in the product. Even so, in these processes of the prior art involving multi-stage ammoniation, the phosphate availability rarely, if ever, for that matter, reaches the high degree of availability realized in my process using only two ammoniation apparatus. (See, for example, U.S. 2,879,153, Nielsson, Mar. 24, 1959, assigned to the assignee of the present invention, and also U.S. 2,913,329, Geiersberger et al., Nov. 17, 1959.) In a further embodiment of my process, whenever potassium chloride or other solid raw materials are needed in the formulation, they are fed in the ammoniator-granulator along with the recycled fines. Furthermore, several new and advantageous features over conventional prior-art methods for producing nitric phosphate fertilizers are realized by the present invention.

Among these advantageous features are: simplicity of the apparatus required, ease of operation of the method, and inexpensive maintenance of the equipment utilized. As to the advantageous feature relating to the simplicity of the apparatus involved in my process, I have, for the first time, been able to produce a nitric phosphate fertilizer with a citrate-soluble availability of as great as 99 percent and, in many instances, in excess of 99 percent, through the use of only two ammoniating apparatus, to wit, the preneutralizer in which I am able to add upwards of 85 percent of the total amount of ammonia to be added to the system backed up to the ammoniator-granulator the use in combination with my preneutralizer vessel allows a substantial degree of flexibility in producing the products of my process. Still furthermore, the use of my process insures a nitric phosphate fertilizer with substantially increased water-soluble phosphate. It also insures a substantially wider variety of grades and ratios such that my product is extremely flexible and, finally, through the use of preneutralizer vessel, the recycle requirements of my process are substantially decreased over the processes of the prior art.

It is, therefore, an object of the present invention to provide a new and improved process for the manufacture of nitric phosphate fertilizers which may be carried out in relatively inexpensive equipment, most of which is readily available in many fertilizer plants.

Still another object of the present invention is to provide a new and improved process for the manufacture of nitric phosphate fertilizers which may be carried out in relatively inexpensive equipment, most of which is readily available in many fertilizer plants, and which process substantially reduces the high recycle rates required in processes of the prior art.

A further object of the present invention is to provide a new and improved process for the manufacture of nitric phosphate fertilizers which may be carried out in relatively inexpensive equipment most of which is readily available in many fertilizer plants, which process substantially reduces the high recycle rates required in processes of the prior art, and which process is characterized by the fact that the water solubility of the phosphate in the product is substantially above twenty percent.

A still further object of the present invention is to provide a process for the manufacture of nitric phosphate fertilizers in which the ammoniation may be carried out easily and to a substantially high degree without undue reversion of the phosphate to a form which is unavailable to the plant and in which a substantially wide variety and range of grades of fertilizer can be produced economically.

Still further and more general objects and advantages of the present invention will appear from the more detailed description set forth, it being understood, however, that this more detailed description is given by way of illustration and explanation only and not by way of limitation, since various changes therein may be made by those skilled in the art without departing from the spirit and scope of the present invention.

My invention, together with further objects and advantages thereof, will be better understood from a consideration of the following description taken in connection with the accompanying drawing in which:

The figure is a flowsheet diagrammatically illustrating a process conducted according to the principles of my invention.

Referring now more particularly to the figure, phosphate rock from a source not shown is fed via line 1 and means for control of flow 2 into hopper 3 and onto movable belt 4 from which it is discharged into first extractor 5. Simultaneously, nitric acid from a source not shown is fed via line 6 and means for control of flow 7 into extractor 5, together with a stream of phosphoric acid from a source not shown being fed via line 8 and means for control of flow 9 into first extractor 5. Subsequently, the material in first extractor 5 is fed via line 11 into second extractor 12, and then via line 13 and means for control of flow 14 in preneutralizer vessel 16. The material fed via line 13 into preneutralizer vessel 16 is contacted in preneutralizer vessel 16 with ammonia from a source not shown and fed via line 17 and means for control of flow 18 into preneutralizer vessel 16. As is noted supra, the amount of ammonia added to preneutralizer 16 may range upwards to 85 percent of the total amount of ammonia to be added in carrying out my process. The slurry resulting in preneutralizer vessel 16 is fed via line 20 and means for control of flow 21 into ammoniator-granulator 22. Simultaneously, recycle material is fed via line 29 and the remaining amount of ammonia to be added is fed from a source not shown via line 23 and means for control of flow 24 into ammoniator-granulator 22. If it is desirable to add other materials to ammoniator-granulator vessel 16, such as potassium chloride as is shown in the figure, such material may be added from a source not shown via line 26 to hopper 27 and onto endless belt 28 wherefrom it is discharged via line 29 into ammoniator-granulator 22.

The product resulting from the reactions in ammoniator-granulator 22 is fed via line 31 into dryer 32 and subsequently via line 33 to the lift generally illustrated at 34 and discharged therefrom via line 34A into cooler 35. The cooled material may be subsequently fed via line 36 to the screening means generally illustrated as 40 from which onsize product is discharged via line 41.

The oversize material from screening means 40 is fed via line 42 to crushing mill generally illustrated at 43 from whence via lift means generally illustrated as 44 and line 45 therefrom is recycled back through screening means 40. The undersize material, shown as fines, is fed via line 50 to hopper 51 where it discharges onto endless belt 28 for recycle to ammoniator-granulator 22 via line 29.

Description of pilot plant

My work was carried out in a TVA continuous ammoniator-granulator pilot plant at Wilson Dam, Ala. The only auxiliary equipment added to the pilot plant (other than that shown in the patent to McKnight et al., supra) for use in the nitric phosphate process was a preneutralizer. Stainless steel was used for acid storage and piping and for the extractors and preneutralizer and their exhaust gas systems; all other equipment was of mild steel construction.

Equipment for metering and feeding acid and phosphate rock.—A magnetic flowmeter was used to meter the premixed phosphoric and nitric acids. The acids were premixed because dual feed systems were not available. A rotometer was used for separate metering of the sulfuric acid whenever it was used. A volumetric feeder was used for feeding the phosphate rock. This feeder was placed on dial-type platform scales for checking and adjusting the feed rates.

Extraction tanks.—Two extraction tanks were arranged in series. All the acids and phosphate rock were fed to the first tank, the second tank being utilized to provide additional reaction time. The extraction tanks were 2 feet in diameter with a 1-foot working depth. Each tank was equipped with a turbine-type agitator containing two 9.5-inch impellers which were driven at 350 revolutions per minute by a 1-horsepower motor. An air ejector was utilized for removing the fumes. Exhaust gas flows as low as 75 cubic feet per minute were satisfactory. The slurry flowed by gravity from the first extractor to the second extractor and from the second extractor into the preneutralizer.

Preneutralizer.—The preneutralizer was a cylindrical tank 20 inches in diameter and 5 feet high equipped with a turbine-type agitator that contained two 7⅝-inch impellers. A 3-foot liquid level was maintained in the tank. Ammonia was fed into the bottom of the tank through a ½-inch perforated pipe. To facilitate fume removal, the preneutralizer was sealed and operated under a slight pressure of 2 to 6 inches of water that resulted from the steam evolved. In earlier tests the preneutralizer was open and ventilation was provided by an air ejector, but fume recovery was unsatisfactory with this type of operation. Usually the slurry from the preneutralizer was pumped through spray nozzles positioned above the ammoniator bed. A magnetic flowmeter and control valve were used to measure, record, and regulate the flow of slurry. An alternative method of feeding the slurry was to allow it to flow by gravity through a "saw-toothed" pipe distributer. The system with the pump was considered the better system because it gave a steady slurry rate and a constant pattern of distribution onto the bed in the ammoniator-granulator.

Ammoniator-granulator.—Completion of the ammoniation and granulation was accomplished in a TVA-type rotary ammoniator-granulator. The ammoniator-granulator was a 3 x 6-foot drum equipped with a reciprocating-type scraper to prevent buildup of solids on the walls of the drum. The direction of rotation of the drum could be reversed in order to facilitate discharging the product and cleaning the distributors, and the speed of rotation could be varied. Ammonia was fed beneath the bed through a ⅜-inch Type 316 stainless steel drilled pipe 42 inches long with 30 holes of 1/16-inch diameter. An exhaust system with a capacity of about 350 cubic feet per minute was used.

Drying, cooling, and sizing.—A conventional rotary dryer and a rotary cooler were used. The gas-fired dryer was 3 feet in diameter by 24 feet long and contained eight 8-inch radial flights. Both countercurrent and cocurrent dryings were tested. The cooler was 2.5 feet in diameter by 21 feet long; it was operated with countercurrent airflow. Some tests were made in which the granulator product was cooled without drying. In other tests the granulator product was dried without cooling. The product was usually sized on 6- and 10-mesh screens, but during some tests the undersize screen was varied from 8 to 12 mesh. A double shaft chain mill was used to crush the oversize material. Whenever it was necessary to recycle some product-size material, it was crushed to pass a separate undersize screen prior to feeding back to the ammoniator-granulator.

Results of pilot-plant tests for 20-20-0 grade

Production rates for pilot-plant tests varied from 0.33 to 0.5 ton per hour. Typical analyses of the raw materials are shown in Table IV and operating data and results of some typical tests are shown in Table V below.

Table IV.—Typical raw materials analyses

Phosphate rock—
  Chemical analysis:                                    Percent
    Total $P_2O_5$ _____ 33.8
    CaO _____ 49.3
    $CO_2$ _____ 3.2
    F _____ 3.9
    $H_2O$ _____ 0.6
  Screen analysis:
    +10 mesh _____ 0.4
    −10 +12 mesh _____ 0.2
    −12 +16 mesh _____ 2.1
    −16 +28 mesh _____ 4.9
    −28 +48 mesh _____ 24.0
    −48 +100 mesh _____ 55.2
    −100 mesh _____ 13.2
Potassium chloride—
  Chemical analysis:
    $K_2O$ _____ 59.0
    $H_2O$ _____ 0.6
  Screen analysis:
    +10 mesh _____ 0.2
    −10 +12 mesh _____ 0.1
    −12 +16 mesh _____ 1.9
    −16 mesh _____ 97.8

TABLE V.—RESULTS FROM PILOT-PLANT TESTS

| Test No | 1 | 2 | 3 | 4 | 5 | 6 |
|---|---|---|---|---|---|---|
| Grade | 20-20-0 | 20-20-0 | 20-20-0 | 15-15-15 | 26-13-0 | 14-28-0 |
| $P_2O_5$ water solubility, percent | 40 | 40 | 40 | 40 | 40 | 40 |
| Type phosphoric acid | (¹) | (²) | (²) | (²) | (²) | (²) |
| Production rate, ton/hr | 0.5 | 0.5 | 0.5 | 0.75 | 0.4 | 0.5 |
| Feed rates, lb./ton product: | | | | | | |
| To extractors: | | | | | | |
| Phosphoric acid (percent $P_2O_5$) | 515 (54) | 325 (76) | 311 (76) | 247 (76) | 207 (76) | 436 (76) |
| Nitric acid (percent $HNO_3$) | 1,405 (60) | 1,340 (60) | 1,317 (65) | 1,027 (60) | 1,983 (60) | 820 (60) |
| Sulfuric acid (94% $H_2SO_4$) | | 51 | 52 | 39 | | 93 |
| Phosphate rock (33% $P_2O_5$) | 454 | 512 | 497 | 387 | 263 | 744 |
| Water | | | | | | 103 |
| Steam | | | | | | 189 |
| To preneutralizer: | | | | | | |
| Anhydrous gaseous ammonia ³ | 225 (82) | 244 (85) | 206 (75) | 179 (85) | 256 (80) | 132 (61) |
| Extractor effluent | 2,366 | 2,110 | 2,227 | 1,642 | 2,440 | 2,288 |
| To ammoniator-granulator: | | | | | | |
| Ammonia (G=gas, L=liquid) | 56 (G) | 42 (G) | 70 (G) | 39 (G) | 63 (G) | 84 (L) |
| Potassium chloride | | | | 482 | | |
| Slurry from preneutralizer | 2,171 | 2,135 | 2,006 | 1,585 | 2,316 | 2,297 |
| Recycle | 9,778 | 5,800 | 4,200 | 3,759 | 9,702 | 9,800 |
| Extractor conditions: | | | | | | |
| Temperature, °F.: | | | | | | |
| First extractor | 117 | 129 | 149 | 133 | 98 | 207 |
| Second extractor | 126 | 135 | 150 | 137 | 99 | 200 |
| $H_2O$ content, percent: | | | | | | |
| Feed material | 28.4 | 23.9 | 21.0 | 24.0 | 31.9 | 26.0 |
| Effluent | 28.1 | 19.6 | | 21.3 | 31.5 | 22.9 |
| Viscosity of effluent, centipoises | 38 | | 124 | 79 | 33 | |
| N loss, percent of total fed | 1.1 | 0.4 | 1.0 | 0.6 | 0.0 | 1.8 |
| Preneutralizer conditions: | | | | | | |
| Temperature, °F | 267 | 280 | 321 | 289 | 285 | 249 |
| pH | 2.1 | 2.1 | 2.1 | 2.2 | 2.0 | 1.6 |
| $H_2O$ content, percent | 11.3 | 9.2 | 4.3 | 7.1 | 16.8 | 17.5 |
| Viscosity of effluent, centipoises | 483 | | 1,150 | 154 | 54 | |
| N loss, percent of total fed | 0.2 | 1.1 | 4.1 | 0.9 | 0.2 | 0.9 |
| Granulation conditions: | | | | | | |
| Recycle: | | | | | | |
| Lb./lb. product | 4.9 | 2.9 | 2.1 | 1.9 | 4.9 | 4.9 |
| Temperature, °F | 148 | 173 | 112 | 159 | 149 | 157 |
| $H_2O$ content, percent | 0.7 | 0.7 | 0.3 | 0.4 | 0.5 | 1.0 |
| Input $H_2O$ content, percent: | | | | | | |
| Including recycle | 2.6 | 2.9 | 1.6 | 2.2 | 3.6 | 4.3 |
| Excluding recycle | 11.0 | 8.7 | 4.1 | 5.4 | 16.4 | 16.8 |
| N loss, percent of total N | 0.2 | 2.4 | 0.4 | 1.1 | 0.3 | 1.0 |
| Granulator product: | | | | | | |
| Temperature, °F | 168 | 185 | 206 | 183 | 179 | 175 |
| $H_2O$ content, percent | 1.7 | 1.4 | 1.1 | 1.1 | 1.3 | 2.2 |
| Screen analysis, percent: | | | | | | |
| +6 mesh | 9 | 13 | 5 | 15 | 12 | 7 |
| −6 +8 mesh | 3 | 3 | 4 | 20 | 7 | 3 |
| −8 +10 mesh | 16 | 26 | 37 | 14 | 31 | 38 |
| −10 +12 mesh | 17 | 11 | 12 | 7 | 18 | 15 |
| −12 +16 mesh | 30 | 25 | 29 | 15 | 20 | 26 |
| −16 mesh | 25 | 22 | 13 | 29 | 12 | 11 |

TABLE V—Continued

| Test No | 1 | 2 | 3 | 4 | 5 | 6 |
|---|---|---|---|---|---|---|
| Dryer conditions (air flow) | (4) | (4) | (5) | (4) | (4) | (4) |
| Product temperature, °F | 220 | 210 | 227 | 224 | 229 | 209 |
| Product $H_2O$ content, percent | 1.0 | 0.8 | 0.5 | 0.5 | 0.6 | 1.4 |
| N loss, percent of total N | 2.1 | 0.9 | 1.1 | 2.4 | 1.7 | 2.4 |
| Onsize product (−6 +10 mesh, unconditioned): | | | | | | |
| Composition, percent: | | | | | | |
| Total N | 20.3 | 20.6 | 20.1 | 15.5 | 25.7 | 15.3 |
| $NH_3-N$ | 11.4 | 11.8 | 11.5 | 8.8 | 13.6 | 9.7 |
| Total $P_2O_5$ | 22.6 | 21.3 | 21.5 | 16.8 | 13.5 | 29.5 |
| Available $P_2O_5$ | 22.3 | 21.1 | 21.3 | 16.7 | 13.4 | 27.8 |
| W.S. $P_2O_5$ | 9.7 | 7.8 | 7.2 | 6.2 | 6.2 | 11.1 |
| CaO | 12.1 | 12.6 | 13.4 | 10.1 | 7.4 | 17.7 |
| $SO_3$ | | 2.2 | 2.4 | 1.6 | | 2.6 |
| $K_2O$ | | | | 14.7 | | |
| $H_2O$ | 1.0 | 0.9 | 0.6 | 0.4 | 0.5 | 1.3 |
| $P_2O_5$ availability, percent | 98.7 | 99.1 | 99.1 | 99.4 | 99.3 | 94.3 |
| W.S. $P_2O_5$, percent of total $P_2O_5$ | 43 | 37 | 34 | 37 | 46 | 38 |

1 Wet-process.
2 Electric-furnace.
3 Value in parentheses represents percent of total ammonia flow.
4 Cocurrent.
5 Countercurrent.

Tests 1, 2, and 3 in Table V were made for production of 20-20-0 grade with 40 percent water-soluble phosphate. Test 1 was made with conventional acid strengths (54 percent $P_2O_5$ wet-process $H_3PO_4$ and 60 percent $HNO_3$), test 2 was made with superphosphoric acid and 60 percent nitric acid, and test 3 was made with superphosphoric acid and 65 percent nitric acid.

In test 1 eighty-two percent of the ammonia was added to the preneutralizer, and the pH of the slurry was 2.1. Slurry water content was about 11 percent at a temperature of 267° F. The viscosity of the slurry was about 500 centipoises. With about 5 pounds of recycle per pound of product, the size distribution of the granulator product was 9 percent plus 6 mesh, 19 percent minus 6 plus 10 mesh, and 81 percent minus 10 mesh. Since about 83 percent of the throughput was recycle, the 19 percent product-size material was very close to the theoretical requirement of 17 percent. The high proportion of undersize provided most of the required recycle in a small particle size to give effective recycle without crushing. The temperature of the granulator product was 168° F., and granulator product moisture was 1.7 percent. After the material was dried with a cocurrent flow of air and a retention time of about 15 minutes, the moisture content of the dryer product was 1.0 percent. Temperature of the dryer product was 220° F. The available and water solubility of the phosphate in the screened product was 98.7 percent and 43 percent.

In test 2, in which superphosphoric acid and 60 percent nitric acid were used, preneutralizer slurry temperature was 280° F. and slurry water content was about 9 percent. With about 3 pounds of recycle per pound of product, the granulator product was 13 percent oversize, 29 percent product size, and 58 percent undersize. Temperature of the granulator product was 185° F. and granulator product moisture was 1.4 percent. Moisture content of the dryer product was 0.8 percent, water solubility of phosphate was 37 percent, and availability was 99.1 percent.

In test 3, in which superphosphoric acid and 65 percent nitric acid were used, preneutralizer slurry temperature was 321° F. and slurry water content was only 4.3 percent. The viscosity of the slurry was about 1200 centipoises. About 2 pounds of recycle per pound of product was required to control granulation. Granulator product temperature was 206° F. with a granulator product moisture of 1.1 precent. The granulator product was 5 percent plus 6 mesh, 41 percent minus 6 plus 10 mesh, and 54 percent minus 10 mesh. After drying countercurrently to a dryer product temperature of 227° F., dryer product moisture was 0.5 percent. The availability of phosphate in the product was 99.1 percent, and water solubility was 34 percent.

Effect of acid concentration on recycle ratio.—As shown in the above data, increasing the acid concentrations from 60 percent nitric acid and 54 percent $P_2O_5$ phosphoric acid to 65 percent nitric acid and superphosphoric acid (76 percent $P_2O_5$) decreased the recycle requirement from 5 pounds per pound of product to 2 pounds per pound of product. These increases in acid concentration decreased the input water from 648 to 444 pounds per ton of product. The estimated effect of acid concentration on minimum recycle ratio is given in Table VI for 20-20-0 grade below.

TABLE VI.—ESTIMATED EFFECT OF ACID CONCENTRATION ON RECYCLE RATIO IN PRODUCTION OF 20-20-0 GRADE

| Nitric acid concentration, percent $HNO_3$ | Conventional strength phosphoric acid (54% $P_2O_5$) | | Superphosphoric acid | |
|---|---|---|---|---|
| | Water input, lb./ton | Lb. recycle/lb. product | Water input, lb./ton | Lb. recycle/lb. product |
| 60 | 648 | 1 5 | 551 | 1 3 |
| 63 | 582 | 4 | 485 | 1 2.5 |
| 65 | 541 | 3 | 444 | 1 2 |
| 68 | 484 | 2.5 | | |

1 Tested in pilot plant.

Effect of nitric acid concentration on preneutralizer operation.—Although increasing the nitric acid concentration from 60 to 65 percent gave a significant reduction in recycle ratio, nitrogen loss from the preneutralizer and slurry viscosity were increased significantly as shown in Table VII below. With 60 percent nitric acid, slurry water content averaged 11 percent and slurry viscosity was about 150 centipoises. Increasing the nitric acid concentration to 65 percent decreased the slurry water content to about 5 percent and increased slurry viscosity to about 1200 centipoises. Also, increasing the nitric acid concentration resulted in increases in nitrogen losses from 1.4 percent to 3.7 percent.

TABLE VII.—EFFECT OF NITRIC ACID CONCENTRATION ON PRENEUTRALIZER OPERATION WHEN PRODUCING 20-20-0 GRADE WITH SUPERPHOSPHORIC ACID

| Nitric acid concentration, percent $HNO_3$ | Slurry temperature, °F. | Slurry $H_2O$, percent | Slurry viscosity, centipoises | N loss, percent |
|---|---|---|---|---|
| 60 | 281 | 11.1 | 150 | 1.4 |
| 63 | 285 | 9.7 | | 2.8 |
| 65 | 318 | 4.8 | 1,200 | 3.7 |

Cocurrent compared with countercurrent drying.—Pilot-plant data averaged from comparable tests of drying 20-20-0 grade, shown in Table VIII, indicate that the direction of airflow made no significant difference in the degree of drying attained. Retention time was about 18 minutes. However, nitrogen loss was 1.6 percent of input nitrogen for cocurrent drying as compared with 0.9 percent for countercurrent drying. Control of dryer operation was better with countercurrent drying. To maintain a dryer product temperature of 220° F., the inlet gas temperature for cocurrent drying averaged about 270° F., as compared to about 250° F. with countercurrent drying.

TABLE VIII.—PILOT-PLANT DRYING RESULTS FOR 20-20-0 GRADE NITRIC PHOSPHATE

| Test No. | 5 | 6 |
|---|---|---|
| Direction of air flow | Cocurrent | Countercurrent |
| Water evaporation, lb./ton product | 44 | 36 |
| Moisture content, percent: | | |
| Feed | 1.3 | 1.1 |
| Product | 0.8 | 0.7 |
| Throughput, lb./hr. dry material | 3,715 | 4,499 |
| Temperature, °F.: | | |
| Feed | 186 | 188 |
| Product | 222 | 223 |
| Gas in | 269 | 251 |
| Air flow c.f.m. at N.T.P | 1,965 | 1,967 |
| N loss, percent | 1.6 | 0.9 |

Effect of recycle particle size on recycle ratio.—In comparable tests of 20-20-0 grade, results in Table IX show that increasing the recycle particle size from 16 percent minus 6 plus 10 mesh to 60 percent minus 6 plus 10 mesh increased the recycle ratio from 2.7 to 4.1. These data show that recycling uncrushed product-size material results in the need for recycle ratios well above the minimum. For this reason, crushing of all material to be recycled to pass the undersize screen is recommended although this would increase crushing and screening requirements. As mentioned previously, it is better to control granulation so that sufficient undersize is produced without crushing.

TABLE IX.—EFFECT OF RECYCLE SIZE ON RECYCLE RATIO IN PRODUCTION OF 20-20-0 GRADE

| Size of screen product | Percent of recycle −6 +10 mesh | Recycle ratio, lb. recycle/lb. product |
|---|---|---|
| −6 +10 mesh | 16 | 2.7 |
| −6 +8 mesh | 60 | 4.1 |

Effect of recycle temperature on recycle ratio.—The effect of recycle temperature on recycle ratio in production of 20-20-0 grade is shown in Table X. Results show that increasing the recycle temperature from 130° to 186° F. made no significant difference in recycle requirement whenever 15 percent of the ammonia was added to the ammoniator-granulator. Temperature of materials in the drum was about 170° to 200° F. However, with 25 percent of the ammonia added to the drum, increasing the recycle temperature from 112° to 174° F. nearly doubled the amount of recycle required to control granulation. Temperature in the drum was about 200° to 210° F. The temperature of the granulator product when the material was beginning to become plastic was about 215° to 220° F.

TABLE X.—EFFECT OF RECYCLE TEMPERATURE ON RECYCLE RATIO FOR 20-20-0 GRADE

| | 15% of ammonia to ammoniator-granulator | | | 25% of ammonia to ammoniator-granulator | | |
|---|---|---|---|---|---|---|
| Test | 60A | 62A | 67A | 79B | 76 | 78 |
| Recycle temp., °F | 130 | 173 | 186 | 112 | 149 | 174 |
| Granulator product temp., °F | 167 | 185 | 196 | 206 | 212 | 202 |
| Granulator product moisture, percent | 1.8 | 1.2 | 1.2 | 0.9 | 0.8 | 0.6 |
| Recycle ratio, lb./lb. product | 2.8 | 2.9 | 3.1 | 2.1 | 2.5 | 3.8 |

Any measures taken to decrease the maximum temperature reached in the ammoniator-granulator probably would allow significant reductions in recycle requirement whenever uncooled recycle and high degrees of ammoniation in the ammoniator are used. Such measures might include the use of liquid instead of gaseous ammonia in the drum or blowing air onto the ammoniator bed.

Drying compared with cooling without drying.—Results from tests in which the 20-20-0 grade granulator product was dried and then cooled are compared with results when the granulator product was cooled without drying in Table XI. These results show that operation with cooled, undried recycle gave recycle ratios as low as those attained with both drying and cooling. However, when 60 percent nitric acid was used (with superphosphoric acid) the product moisture content was 3.6 percent as compared with only 1.0 percent with drying. The material with 3.6 percent moisture did not store satisfactorily even under most favorable conditions. These data suggest the possibility of drying only product-size material and recycling undried material.

TABLE XI.—EFFECT OF DRYING COMPARED WITH COOLING WITHOUT DRYING WHEN PRODUCING 20-20-0 GRADE

| | 60% HNO₃ | | 63% HNO₃ | | 65% HNO₃ | |
|---|---|---|---|---|---|---|
| | Drying | Cooling | Drying | Cooling | Drying | Cooling |
| Recycle moisture, percent | 0.7 | 3.3 | 0.6 | 1.6 | 0.3 | 0.9 |
| Granulator product moisture, percent | 1.4 | 4.1 | 1.2 | 2.6 | 1.1 | 1.4 |
| Granulator product temp., °F | 179 | 147 | 186 | 170 | 206 | 170 |
| Screen product moisture, percent | 1.0 | 3.6 | 1.0 | 2.2 | 0.5 | 1.0 |
| Lb. recycle/lb. product | 4.1 | 3.6 | 2.8 | 2.9 | 2.1 | 2.1 |

With 60 percent nitric acid the granulator product moisture content was 4.1 percent with cooling as compared with only 1.4 percent when drying was used. Karl Fischer moisture determinations gave much higher moisture values than did vacuum desiccation determinations. Apparently, some hydrates were formed during tests of cooling only. The chemical nature of these hydrates is not known. X-ray analysis of the cooled material indicated that hydrates of monocalcium phosphate were not present.

Increasing the nitric acid concentration from 60 to 65 percent gave undried products with lower moisture contents. When 65 percent nitric acid was used (with 25% of the ammonia to the ammoniator-granulator), the product moisture was only about 1.0 percent. Apparently, the use of the more concentrated nitric acid, with lower water input and higher heat input to the ammoniator-granulator might give a product that will store satisfactorily without drying.

Results of pilot-plant tests for 15-15-15 grade

Results from pilot-plant operation in production of 15-15-15 grade in test 4 are also given in Table V. The formulation was the same as that used for production of 20-20-0 grade except that the required proportion of potassium chloride was added with the recycle feed to the ammoniator-granulator.

With 60 percent nitric and superphosphoric acids, about 1.9 pounds of recycle per pound of product were required to control granulation. In test 2, in which 20-20-0 grade was produced with the same acid concentrations, the recycle ratio was 2.9.

When producing the 15-15-15 grade, the granulator product was 34 percent onsize, 15 percent oversize, and 51 percent undersize. With a recycle ratio of 1.9, the 34 percent onsize was almost exactly the proper degree of granulation required to maintain a balance in operation without crushing any onsize. The phosphate in the screened product had an availability of 99.3 percent and a water solubility of 37 percent.

Results of pilot-plant tests for 26-13-0 grade

Data from pilot-plant production of 26-13-0 grade (which gives 20-10-10 grade when mixed with the proper proportion of potash) are also shown in Table V. With 80 percent of the ammonia added to the preneutralizer, slurry temperature was 285° F., and slurry water content was about 17 percent. The slurry was very fluid with a viscosity of only 54 centipoises.

With about 5 pounds of recycle per pound of product, the granulator product was 38 percent onsize, 12 percent oversize, and 50 percent undersize. With this degree of granulation, some product was crushed to maintain the required amount of recycle. The availability of the phosphate was 99.3 percent and water solubility was 46 percent.

Results of pilot-plant tests for 14-28-0 grade

Data from production of 14-28-0 grade (test 6) at a production rate of 0.5 ton per hour are shown in Table V. In order to obtain satisfactory conversion of phosphate in the rock and slurry fluidity, water and steam were added to the first extractor to increase the temperature from about 150° to 200° F. With 61 percent of the required ammonia fed to the preneutralizer, slurry water content was about 17 percent. When more than about 60 percent of the ammonia was added to the preneutralizer, the slurry became too viscous to flow.

About 5 pounds of recycle per pound of product was required to control granulation.

Results of bag-storage tests

Bag-storage results on all grades produced showed that products containing no potash had satisfactory storage properties with 1 percent moisture when conditioned with either 1 percent calcined fuller's earth or 2 percent kaolin clay. Products containing potash and dried to about 0.5 percent moisture stored satisfactorily after dusting with either 2 percent kaolin or 1 percent calcined fuller's earth. Tests were not made with products with 1 percent moisture containing potash.

In recapitulation, it may be seen from the foregoing discussion of my work that nitric phosphate products have a significant cost advantage over competing products. By utilizing some modifications in formulation, phosphate water solubility of 40 percent can be economically attained. By utilizing highly concentrated nitric and phosphoric acids, which are rapidly becoming available in the fertilizer industry, several grades can be produced with recycle ratios in the range of 2 to 3. Construction and operation of a nitric phosphate plant are similar to those for granular diammonium phosphate. With comparatively minor equipment additions, most granular diammonium phosphate plants could be altered for production of nitric phosphates.

While I have shown my invention in but several forms thereof, it will be obvious to those skilled in the art that it is not so limited but is susceptible to various changes and modifications without departing from the spirit thereof and I desire, therefore, that only such limitations shall be placed thereupon as are specifically set forth in the appended claims.

What I claim as new and desire to secure by Letters Patent of the United States is:

1. In a process for the production of granular nitric phosphate fertilizer consisting essentially of extracting phosphate rock in particles at least fine enough to pass a standard 10-mesh screen for about 5 to about 60 minutes with acid, said acid consisting of substantial quantities of nitric acid together with only supplemental quantities of sulfuric acid, phosphoric acid, and mixtures thereof, in quantity sufficient to form a fluid slurry; introducing dried fines recycled from a later-mentioned sizing step into a rotating drum; maintaining a bed of rolling, solid particles of the recycled fines in said drum; passing said slurry to said drum; distributing the slurry on the full length of the bed of rolling, solid particles in a spray in quantity sufficient to moisten the solid particles; introducing an ammoniating fluid beneath the bed of rolling, solid particles, controlling in part the temperature of the bed of particles by (1) adjusting the temperature of the slurry fed to said drum, (2) controlling the proportion of fines recycled, and (3) controlling the amount of ammonia fed beneath the bed of solid particles; withdrawing at least partially granulated nitric phosphate fertilizer from the drum; drying, cooling, and sizing the withdrawn material; and recycling fines to the rotating drum, the improvement in combination therewith for producing granular nitric phosphate fertilizer having a phosphate availability of about 99 percent, which consists of the steps of introducing the fluid slurry withdrawn from the extraction step into a preneutralizer vessel before introducing said slurry into the rotating drum; introducing from about 75 percent to about 85 percent of the total amount of ammonia which is to be added to the process to said slurry in said preneutralizer vessel for reaction therewith; and subsequently withdrawing the partially neutralized slurry of phosphate rock acidulate from said preneutralizer vessel and introducing same into said rotating drum, adding the remaining ammonia to the slurry in the rotating drum, said partially neutralized slurry containing the calcium fluoride formed by the acidulation of the phosphate rock in the extraction step and the subsequent neutralization of the resulting acidulate in said preneutralizer vessel.

2. The process of claim 1 wherein about 85 percent of the formulated ammonia to be ultimately introduced into the process is added into the preneutralizer vessel.

References Cited

UNITED STATES PATENTS

| | | | |
|---|---|---|---|
| 2,978,313 | 4/1961 | Moyrand et al. | 71—37 |
| 3,028,230 | 4/1962 | Brosheer | 71—37 |
| 3,091,523 | 5/1963 | Smith | 71—37 |

DONALL H. SYLVESTER, *Primary Examiner.*

T. G. FERRIS, *Assistant Examiner.*

U.S. Cl. X.R.

71—40, 41, 64